United States Patent
Kalous (10) Patent No.: US 8,031,061 B2
(45) Date of Patent: Oct. 4, 2011

(54) TRAILER ALARM

(75) Inventor: D. Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 353 days.

(21) Appl. No.: 12/260,556

(22) Filed: Oct. 29, 2008

(65) Prior Publication Data

US 2009/0072956 A1 Mar. 19, 2009

Related U.S. Application Data (63) Continuation-in-part of application No. 11/656,677, filed on Jan. 23, 2007, now Pat. No. 7,535,346.

(60) Provisional application No. 60/983,331, filed on Oct. 29, 2007, provisional application No. 60/792,549, filed on Apr. 17, 2006.

(51) Int. Cl.
G08B 21/00 (2006.01)

(52) U.S. Cl. .............. 340/431; 340/425.5; 340/426.1

(58) Field of Classification Search ............ 340/431, 340/425.5, 426.1, 687; 307/10.8, 9.1
See application file for complete search history.

(56) References Cited

U.S. PATENT DOCUMENTS

| | | | |
|---|---|---|---|
| 4,127,855 A * | 11/1978 | Toner | 340/687 |
| 4,430,637 A | 2/1984 | Koch-Ducker et al. | |
| 4,737,763 A | 4/1988 | DeFino et al. | |
| 5,059,945 A | 10/1991 | Scheele et al. | |
| 5,378,929 A * | 1/1995 | Mor et al. | 303/89 |
| 5,434,552 A * | 7/1995 | Ems | 340/431 |
| 5,488,352 A * | 1/1996 | Jasper | 340/431 |
| 5,522,530 A | 6/1996 | Boettcher | |
| 6,166,627 A | 12/2000 | Reeley | |
| 6,218,952 B1 * | 4/2001 | Borland et al. | 340/641 |
| 6,466,028 B1 * | 10/2002 | Coppinger et al. | 324/504 |
| 6,501,376 B2 * | 12/2002 | Dieckmann et al. | 340/479 |
| 6,512,455 B2 | 1/2003 | Finn et al. | |
| 6,525,654 B1 * | 2/2003 | Siggers | 340/438 |
| 6,737,960 B2 * | 5/2004 | Preston | 340/426.1 |
| 6,788,190 B2 * | 9/2004 | Bishop | 340/435 |

(Continued)

FOREIGN PATENT DOCUMENTS

GB 2017432 A * 10/1979

OTHER PUBLICATIONS

International Search Report and Written Opinion from International Application No. PCT/US2007/08326, mailed Sep. 3, 2008.

(Continued)

*Primary Examiner* — Eric M Blount
(74) *Attorney, Agent, or Firm* — Calfee, Halter & Griswold LLP (57) ABSTRACT

An alarm device for use with a vehicle includes an input connector for electrical connection with a vehicle wiring harness of a vehicle, an output connector for electrical connection with a trailer lighting receptacle of a trailer, and an alarm circuit electrically connected in series between the input connector and the output connector. The alarm circuit is configured to detect a presence or absence of an electrical signal supplied to the input connector for delivery through the output connector to an electrically powered component of the trailer. The alarm circuit is configured to deliver an alert signal when the alarm circuit detects the absence of the electrical signal.

18 Claims, 7 Drawing Sheets

U.S. PATENT DOCUMENTS

| | | | |
|---|---|---|---|
| 6,844,829 B2 | 1/2005 | Mayor | |
| 7,034,683 B2 | 4/2006 | Ghazarian | |
| 7,038,585 B2 | 5/2006 | Hall et al. | |
| 7,081,813 B2 | 7/2006 | Winick et al. | |
| 7,091,857 B2 | 8/2006 | Lanigan et al. | |
| 7,307,514 B2 | 12/2007 | McAden | |
| 2003/0098786 A1* | 5/2003 | Bishop | 340/435 |
| 2004/0095227 A1* | 5/2004 | Lehman | 340/425.5 |
| 2006/0087413 A1* | 4/2006 | Lee | 340/431 |
| 2007/0241869 A1 | 10/2007 | Kalous | |
| 2007/0262853 A1 | 11/2007 | Bradus et al. | |
| 2008/0042809 A1 | 2/2008 | Watts et al. | |

OTHER PUBLICATIONS

"Trailer Dog Alarm Security System", Product Review from http://bikebone.com, 2 pgs., dated at least as early as Feb. 4, 2005.

"Mobile Lock GPS Locator with Anti-Theft Alarm-D5500" product information, 1 pg from http://www.dewalt.com/us/products/tool_detail.asp?productID=10784, date at least as early as Jul. 6, 2007.

Trailer-Alarms.com, Vericom Technologies product information from http://www/trailer-alarms.com/vericom.htm., pp. 1-2, dated at least as early as Nov. 22, 2006.

Armed Guard Electronic Security, "Portable Alarm System" product information, 2 pgs., dated at least as early as Mar. 26, 2006.

"Pro-Tec System One Trailer Security Systems, Professional Technology to Pro-Tec Your Investment" Tomal Systems LLC product information, 16 pgs., dated at least as early as Oct. 20, 2005.

Armed Guard GForce product information, http://www/alarm-guard.com, 3 pgs., dated as early as Mar. 26, 2006.

Armed Guard Sport Alarm product information from http://www/alarm-guard.com, 1 page, dated as early as Mar. 26, 2006.

* cited by examiner

FIG. 8

TRAILER ALARM

CROSS-REFERENCE TO RELATED APPLICATIONS

This non-provisional application claims the benefit of U.S. Provisional Patent App. No. 60/983,331, entitled "Trailer Alarm" and filed on Oct. 29, 2007, the entire disclosure of which is hereby incorporated by reference, to the extent that it is not conflicting with the present application. This application is also a continuation-in-part of U.S. patent application Ser. No. 11/656,677, entitled "Trailer Alarm" and filed on Jan. 23, 2007, which claims the benefit of U.S. Provisional Patent App. No. 60/792,549, entitled "Trailer Alarm" and filed on Apr. 17, 2006, the entire disclosures of both of which are hereby incorporated by reference, to the extent that they are not conflicting with the present application.

BACKGROUND

Trailers can be designed to couple or otherwise attach to a truck, sports utility vehicle, or other such vehicle capable of towing the trailer. Trailers can be designed for towing large and heavy items and as a result, trailers often carry valuable items. For example, trailers often are used to tow boats, automobiles, all terrain vehicles, motorcycles, and commercial goods. Such goods and items are often transported across large distances. During such a trip, the vehicle and the attached trailer carrying the valuable items are often left unattended while the driver stops to rest for the night or eat a meal. Such circumstances leave the trailer and cargo susceptible to theft.

The trailer itself can also be a valuable item. Many trailers are designed for a specific purpose, such as towing a boat or a pair of wave runners, and, as a result, can be relatively expensive. Boats or wave runners are often towed to a lake or other such body of water, removed from the trailer, and put into use. This leaves the vehicle and the trailer coupled to the vehicle unattended and a potential target of theft.

SUMMARY

The present application contemplates alarm systems and methods for alerting a user of an unauthorized attempt to separate a trailer, cargo, or other towed item from a towing vehicle. According to an inventive aspect of the present application, an alarm device may be placed in electrical communication with an electrical component mounted to or otherwise associated with the towed item, with the alarm device being configured to detect a condition of the towed item indicating an unauthorized attempt to separate the towed item from the towing vehicle.

Accordingly, in one embodiment, an alarm device for use with a vehicle includes an input connector for electrical connection with a vehicle wiring harness of a vehicle, an output connector for electrical connection with a trailer lighting receptacle of a trailer, and an alarm circuit electrically connected in series between the input connector and the output connector. The alarm circuit is configured to detect a presence or absence of an electrical signal supplied to the input connector for delivery through the output connector to an electrically powered component of the trailer. The alarm circuit is configured to deliver an alert signal when the alarm circuit detects the absence of the electrical signal.

In another embodiment, an alarm device for use with a vehicle includes a first connector for electrical connection with a vehicle trailer wiring receptacle of a vehicle, a second connector for electrical connection with a trailer wiring connector of a trailer, and an alarm component electrically connected in series between the first and second connectors. A power line electrically connects the first connector to the second connector to deliver vehicle power from the first connector to the second connector. A signal path electrically connects the first connector to the second connector to deliver electrical signals from the vehicle to electrically operable components on the trailer when the vehicle trailer wiring receptacle is connected with the first connector and the trailer wiring receptacle is connected with the second connector. The alarm component is configured to detect an electrical condition indicating an unauthorized attempt to separate the trailer from the vehicle, and to produce a corresponding alert signal.

According to still another embodiment of the present application, a method of detecting separation of a towed item from a towing vehicle includes connecting a sensor to one of the item and the vehicle and connecting an alarm component to the other of the item and the vehicle. The alarm component and the sensor are placed within a communication circuit covering a predetermined area, and the presence of the sensor and the alarm component within the communication circuit is determined. An alert signal is provided when one of the sensor and the alarm component is not detected within the communication circuit, and a perceptible alert is provided in response to the alert signal. Disconnecting the sensor from the one of the item and the vehicle deactivates a circuit completion mechanism to remove the sensor from the communication circuit.

DESCRIPTION OF THE DRAWINGS

In the accompanying drawings, which are incorporated in and constitute a part of this specification, embodiments of the inventions are illustrated, which, together with the description of the inventions serve to illustrate the principles of the inventions. The drawings and detailed description are not intended to and do not limit the scope of the claims in any way. Instead, the drawings and description only describe embodiments of the inventions and other embodiments of the inventions not described are encompassed by this disclosure of the invention.

DETAILED DESCRIPTION

The Detailed Description of the Invention merely describes preferred embodiments of the invention and is not intended to limit the scope of the claims in any way. Indeed, the invention as described by the specification and claims is broader than and unlimited by the preferred embodiments, and the terms used in the claims have their full ordinary meaning.

This invention and disclosure are directed to methods and apparatus for securing trailers coupled to towing vehicles to prevent the theft of the trailer or cargo carried on the trailer. Such methods and apparatus are designed to detect when a trailer or cargo is separated from the towing vehicle. In addition, the methods and apparatus can be designed to alert the owner or others that the trailer or cargo is separated from the towing vehicle. In one embodiment, this alert can take the form of an audible alert, such as a siren.

The invention includes embodiments for detecting when a trailer is decoupled from the towing vehicle as well as embodiments for detection when the trailer is moved a defined distance away from the towing vehicle. In addition, the invention includes embodiments to detect when cargo is removed from the trailer or when the cargo is moved a defined distance from either the towing vehicle or the trailer.

Figure 1:
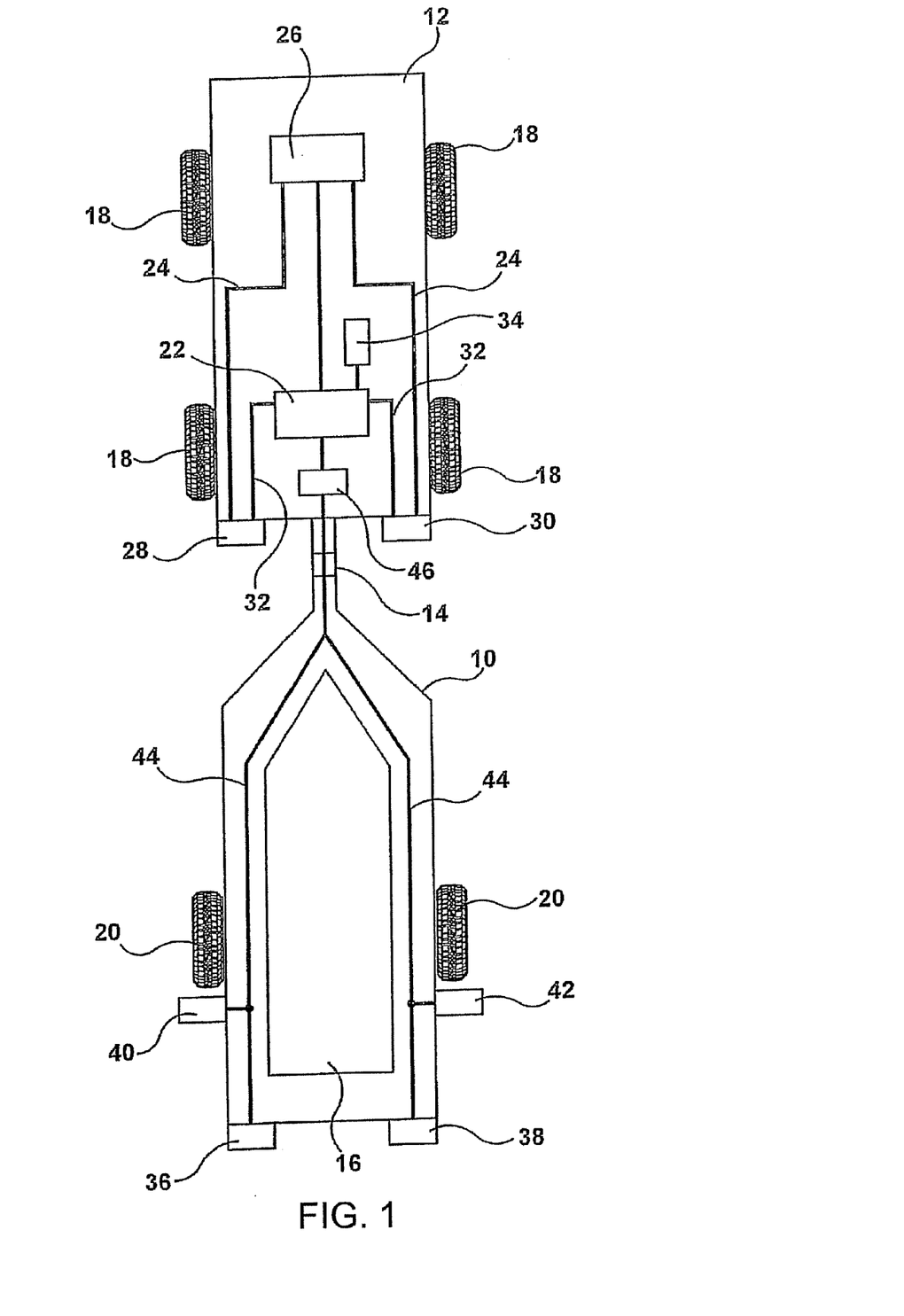
FIG. 1 is a schematic view of an embodiment of an alarm arranged in accordance with the present invention.

Referring to FIG. 1, an exemplary embodiment of the invention is schematically illustrated. A trailer 10 carrying cargo is coupled to a towing vehicle 12. The trailer 10 is coupled to the towing vehicle 12 at a connection joint 14 (e.g., a hitch ball) connected to the towing vehicle 12 and a coupler connected to the trailer 10. In the exemplary embodiment of FIG. 1, the cargo carried on the trailer 10 is a boat 16. Although the cargo as shown is a boat, the cargo can be any number of items, such as for example, commercial goods, all terrain vehicles, motorcycles, automobiles, and the like. The towing vehicle 12 includes four wheels 18 and the trailer 10 includes two wheels 20.

An alarm 22 is attached to the towing vehicle 12. In the illustrated embodiment, the alarm 22 is mounted to the underside of the towing vehicle 12 body. It is to be understood that the alarm 22 can be positioned in any number of alternative locations on the towing vehicle 12 or the trailer 10, such as, for example, the underside of the trailer 10 or in the passenger cabin of the towing vehicle 12. In still another embodiment, an alarm may be electrically connected between the vehicle trailer wiring receptacle of a vehicle and the trailer wiring connector of a trailer.

The vehicle 12 and trailer 10 are both equipped with lighting systems. Such systems are safety features for vehicles and trailers. These systems include turning signal lights and brake lights at the rear of the vehicle or trailer to alert surrounding vehicles of a driver's intention to turn, slow, or stop the vehicle. In addition, these lighting systems include running lights which allow drivers of surrounding vehicles to see a towing vehicle or trailer more clearly when driving at dusk or at night. When a trailer is attached to a towing vehicle, the trailer or cargo being carried on the trailer can obscure the rear lights of the vehicle. To reduce the likelihood of such a hazard, the lighting system of the trailer is typically connected to the lighting system of the towing vehicle. This connection allows for the trailer lighting system to detect signals from the towing vehicle lighting system, which allows for the rear lights of the trailer to appropriately signal when the towing vehicle is braking or making a turn.

The connection of the trailer lighting system to the vehicle lighting system provides an opportunity to integrate the alarm system into this connection. Referring again to FIG. 1, vehicle wiring 24 electrically connects a vehicle power source 26 (e.g., a vehicle battery) to the left rear light 28 and the right rear light 30 of the towing vehicle 12. The vehicle wiring 24 provides electrical power from the vehicle battery 26 to the rear lights 28 and 30. The vehicle wiring 24 also carries signals to the rear lights 28 and 30 to command the lights 28 and 30 to blink when the driver engages a turn signal or to illuminate when the driver depresses the brake pedal.

Alarm wiring 32 electrically connects the rear lights 28 and 30 to the alarm 22. This connection can provide power to the alarm 22 from the vehicle battery 26 and can pass on command signals to the alarm 22. Electrical power is typically provided to the rear lights 28 and 30 only when the vehicle engine is running. In view of that fact, the vehicle battery 26 is directly connected to the alarm 22 to ensure that the alarm 22 is powered even when the engine is not running. Optionally, an alarm battery 34 can be mounted to the vehicle 12 to provide another source of power for the alarm 22. The alarm battery 34 can power the alarm 22 in the event that the vehicle battery 26 dies or the connection between the vehicle battery 26 and the alarm 22 is severed. For security purposes, the alarm battery 34 can be integrated into the alarm 22 such that the connection between the alarm battery 34 and the alarm 22 cannot be severed without detection.

The trailer lighting system includes a left rear light 36, a right rear light 38, a left side light 40, and a right side light 42. Trailer wiring 44 electrically connects the trailer lights 36, 38, 40, 42 to the alarm 22. With both the vehicle lighting system and the trailer lighting system connected to the alarm 22, the alarm 22 can pass command signals from the vehicle lighting system to the trailer lighting system, to properly illuminate the trailer rear lights 36 and 38 and side lights 40 and 42. For example when the driver of the vehicle 12 engages the left turn signal, the signal passes through the vehicle lighting system, through the alarm, to the trailer lighting system, and to the left tail light 36 of the trailer 10 such that the light 36 blinks to indicate the vehicle 12 is about to turn left. This same method is applicable to the driver engaging the right turn signal, depressing the brake pedal, engaging the running lights, and the like.

Trailers typically do not have independent sources of electrical power and must draw electrical power from a towing vehicle. The connection of the trailer lighting system to the alarm 22 can allow the alarm 22 to pass electrical power from the vehicle lighting system to the trailer lighting system to power the trailer lights 36, 38, 40, 42. Alternatively, the trailer lights 36, 38, 40, 42 can be powered by the vehicle battery 26, which is directly connected to the alarm 22. By providing power directly from the battery 26 to the trailer lighting system, through the alarm 22, no additional electrical load is placed on the vehicle lighting system by the trailer lights 36, 38, 40, 42. This arrangement may assure that the load on the vehicle lighting system stays within the range for which it is designed.

Lighting systems can come in at least two varieties. In one variety, a single bulb or filament is used for both a turn signal and a brake light and in a second variety two separate bulbs or filaments are used for the turn signal and the brake light. If the vehicle lighting systems and the trailer lighting system differ and are not compatible, the alarm 22 can be arranged to convert the signal from the vehicle lighting system before sending an adjusted signal to the trailer lighting system.

By utilizing the alarm 22 to connect the trailer lighting system to the vehicle lighting system, the alarm 22 can be arranged to detect or determine when the trailer 10 is detached or moved away from the towing vehicle 12. As shown schematically in FIG. 2, a four connector plug 46 is attached to the trailer lighting system. The plug 46 creates the physical connection between the trailer lighting system and the alarm 22. The trailer lighting system includes three electrical circuits connected to the plug and one electrical ground. The plug 46 has four separate connection points 48, 50, 52, 54. The exemplary connection points 48, 50, 52, 54 can be either a series of four pins or a series of four receptacles, with the alarm 22 including corresponding mating receptacles or pins, respectively.

Figure 2:
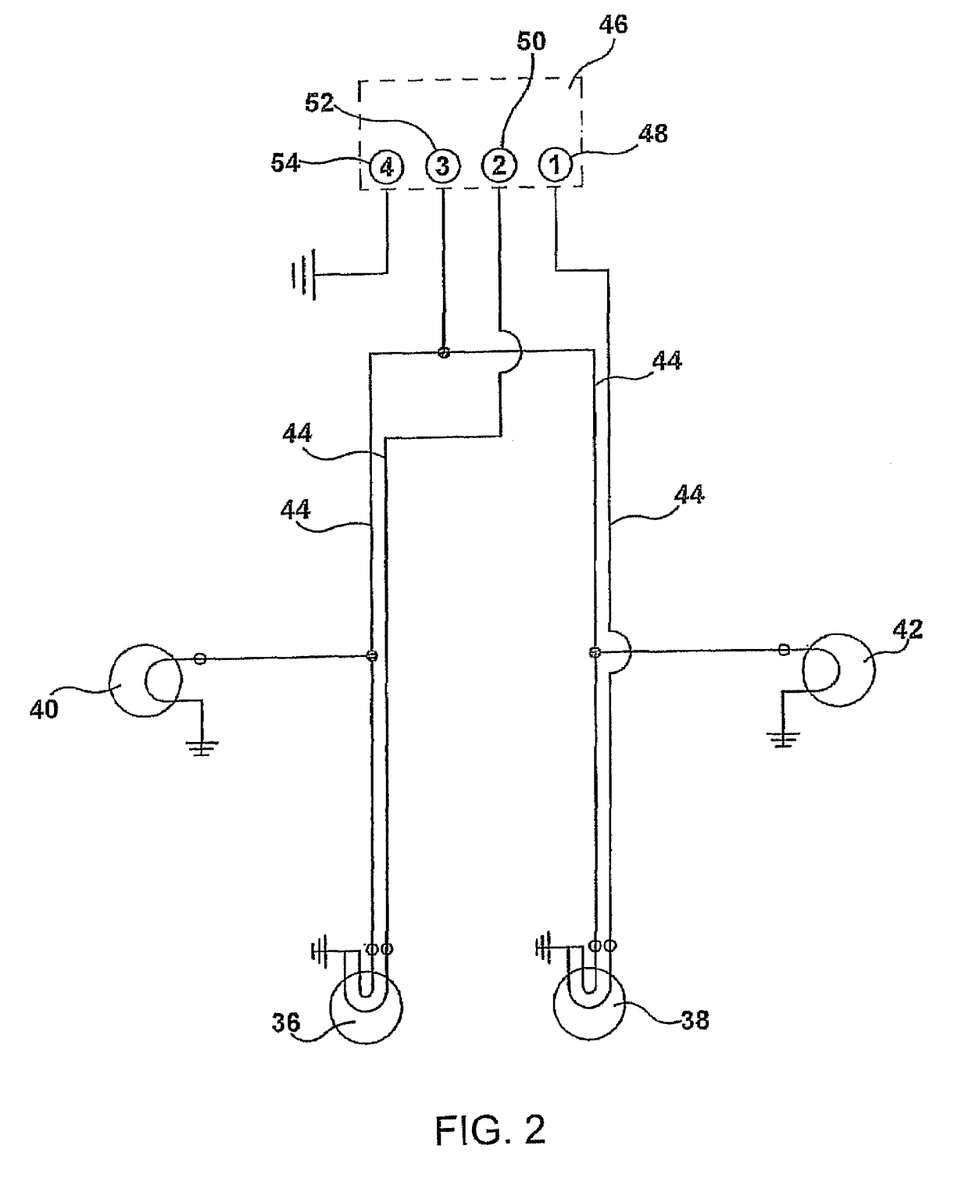
FIG. 2 is a schematic view of electrical circuits of a trailer lighting system attached to the alarm of FIG. 1.

The alarm 22 can detect and evaluate the three circuits through the connection points 48, 50, 52, 54. The first connection point 48 is in electrical contact with a first circuit that runs to the right rear light 38; the second connection point 50 is in electrical contact with a second circuit that runs to the left rear light 36; the third connection point 52 is in electrical contact with a third circuit which runs to both rear lights 36 and 38 and to both side lights 40 and 42; and the fourth connection point 54 is in electrical contact with an electrical ground. The first circuit is used to illuminate the right rear light 38 when the right turn signal is engaged or the brake is depressed. The second circuit is use to illuminate the left rear light 36 when the left turn signal is engaged or the brake depressed. The third circuit is used to illuminate all four trailer lights 36, 38, 40, 42 when the running lights are turned on.

The alarm 22 can be arranged to continuously monitor or periodically sample the first, second, or third connection points 48, 50, 52 to determine if the trailer lighting system circuits are closed or open. If the circuit is closed, the alarm 22 takes no action. If the circuit is open, the alarm 22 issues an alert.

If the trailer 10 is detached from the towing vehicle 12 and moved a material distance away from the towing vehicle 12, the trailer lighting system must be separated from the alarm 22. When the trailer lighting system is separated from the alarm 22, each of the three circuits will be open. Once the alarm 22 detects an open circuit, the alarm can issue an audible alert to warn that the trailer is being moved by an unauthorized person. The circuits will be open if the plug 46 is detached from the alarm, the wiring 44 connecting the trailer lighting system to the alarm 22 is severed, or other similar circumstances.

The alarm 22 can be designed to allow a circuit to be open for a relatively short period of time without the alarm 22 issuing an audible alert. This time period can be chosen to account for the circuit being momentarily open due to vibrations during driving, physical impact on various components, or other instances of noise in the electrical systems. As an example, the alarm 22 can be designed to sample a circuit every ten milliseconds with an audible alert triggered only if the circuit is open during two consecutive samples. The described time period is exemplary only; however, the time period should be short enough to prevent an unauthorized person from quickly disconnecting the plug 46 and replacing it with a device that will replicate a closed circuit on the first, second, and third connection points 48, 50, 52.

The alarm 22 can be designed such that the vehicle owner or other authorized persons can activate and deactivate the alarm 22. One exemplary method of activating and deactivating the alarm is by a wireless remote device, such as a key fob using infrared or radio signals. Alternatively, a key pad can be mounted on the towing vehicle 12 or in the passenger cab and connected to the alarm 22 to allow the owner to enter a security code to arm or disarm the alarm 22. In addition, the alarm system can be automatically deactivated when certain vehicle or carrier conditions are met, such as the opening of doors.

The alarm 22 is described as issuing an audible alert when a circuit is open. This warning method is exemplary only. Any method of warning the vehicle owner or those near the vehicle is included in the invention. For example, a visual warning such as a flashing light or a wireless message sent to the vehicle owner's cell phone, pager or other such device are variations of the invention as described herein.

Figure 3:
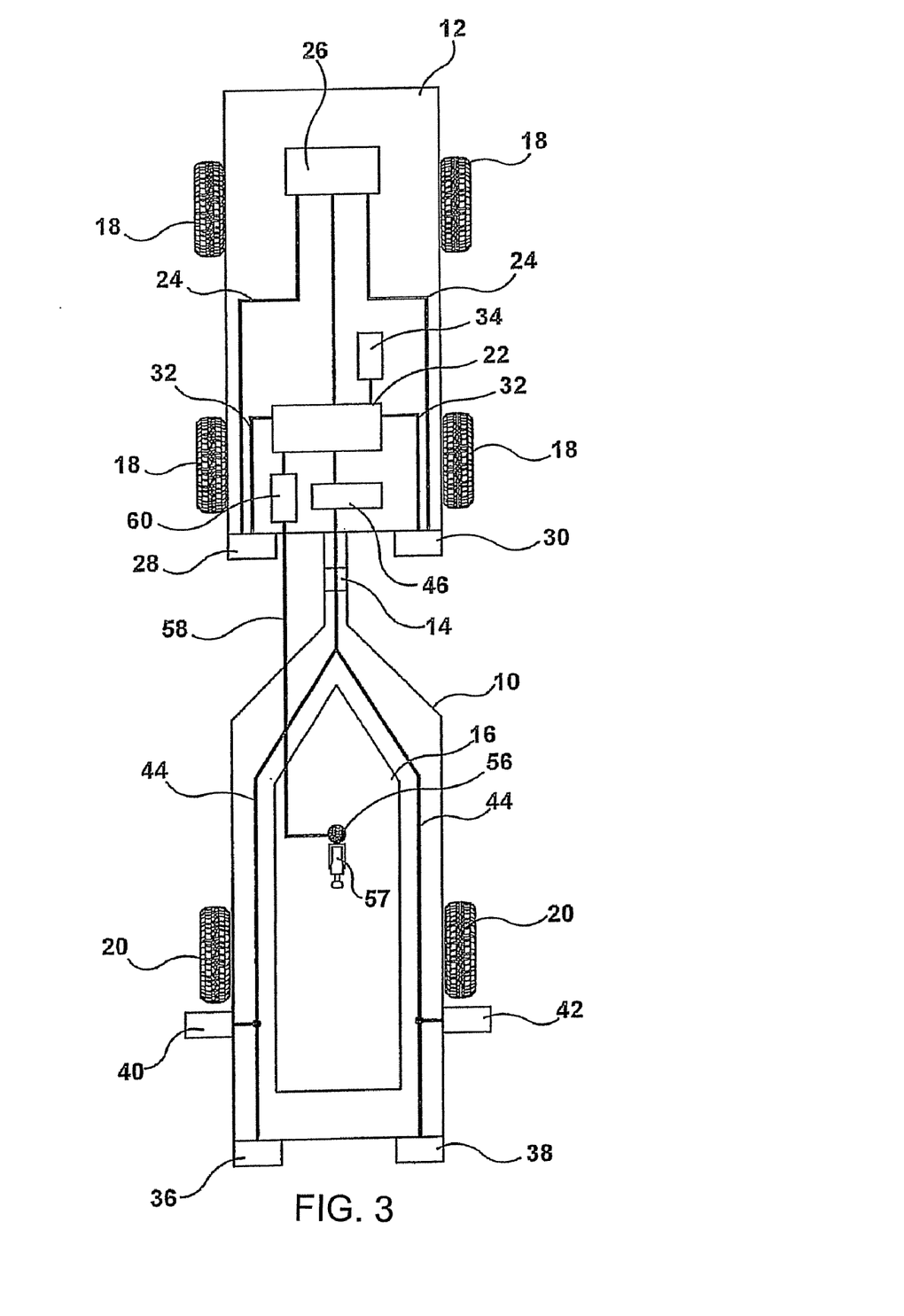
FIG. 3 is a schematic view of another embodiment of an alarm arranged in accordance with the present invention.

Other apparatus may additionally or alternatively be used to secure a towed item (e.g., the trailer 10 or an item carried on the trailer) against unauthorized removal or separation from the vehicle. As shown in FIG. 3, an alarm component, such as a sensor 56 can be attached to a boat 16 or other cargo carried on the trailer 10, or may be attached directly to the trailer 10. When used separately, the sensor 56 may be mounted on a bike rack, cargo carrier, or items in the bed of a pick up truck. The exemplary sensor 56 is in electrical communication with the alarm 22 through sensor wiring 58 and a sensor head 60. The sensor wiring 58 supports a circuit between the sensor head 60 and the sensor 56. The sensor wiring may be integral to the structure of a vehicle, a trailer, a bike rack, or cargo carrier. The sensor head 60 is similar to the plug 46 described above in that it offers connection points through which the alarm 22 can detect if a circuit leading to the sensor 56 is closed or open. Additional sensors (not shown) or sensor features may be included, such as sensing circuitry, proximity or vibration sensors, wireless transponders, accelerometers, or other such devices to alternatively detect tampering with the cargo to which the sensor head 60 or additional sensors are attached. If the circuit is open, or the proximity or vibration sensors are triggered, the alarm 22 can issue an audible alert that the cargo is being moved away from the towing vehicle. The sensor may include the additional feature of a vehicle power adaptor 57 that provides a battery power receptacle for use for lights, etc.

An unauthorized person may attempt to remove cargo (e.g., boat 16) from the trailer 10 or remove the trailer 10 from the towing vehicle 12 by removing the sensor 56 from the cargo 16 or by detaching or severing the sensor wiring 58 from the sensor head 60. Either of these actions opens the circuit between the sensor head 60 and the sensor 56. The alarm 22 is arranged to detect such an open circuit. As discussed in greater detail above, an open circuit may automatically result from an electrical disconnection of the sensor 56 from the alarm 22. In the case of removal of the sensor 56 from the towed item (i.e., trailer 10 or cargo 16), the sensor may be configured to disconnect from the alarm circuit in response to such removal. In one exemplary embodiment, the sensor 56 can be a mechanical switch with two positions. When the sensor 56 is attached to the cargo 16, the attachment forces the switch into a first position that allows a closed circuit from the sensor head 60 to the sensor 56. If the sensor 56 is detached from the boat 16, the switch moves to a second position that does not allow a circuit to form between the sensor head 60 and the sensor 56, resulting in an open circuit condition.

While the embodiment of FIG. 3 shows the sensor wiring 58 and sensor head 60 as a separate line and connection from the vehicle to the trailer or cargo item, in another embodiment, an alarm system may utilize the trailer wiring and connection to provide a connection from the alarm to the sensor. For example, a conventional seven pin trailer connection may be utilized to directly or indirectly supply continuous power, via the auxiliary line or power line, to the sensor, to power the sensor to detect changes in movement, position, proximity, electrical continuity, or other such conditions.

Figure 4:
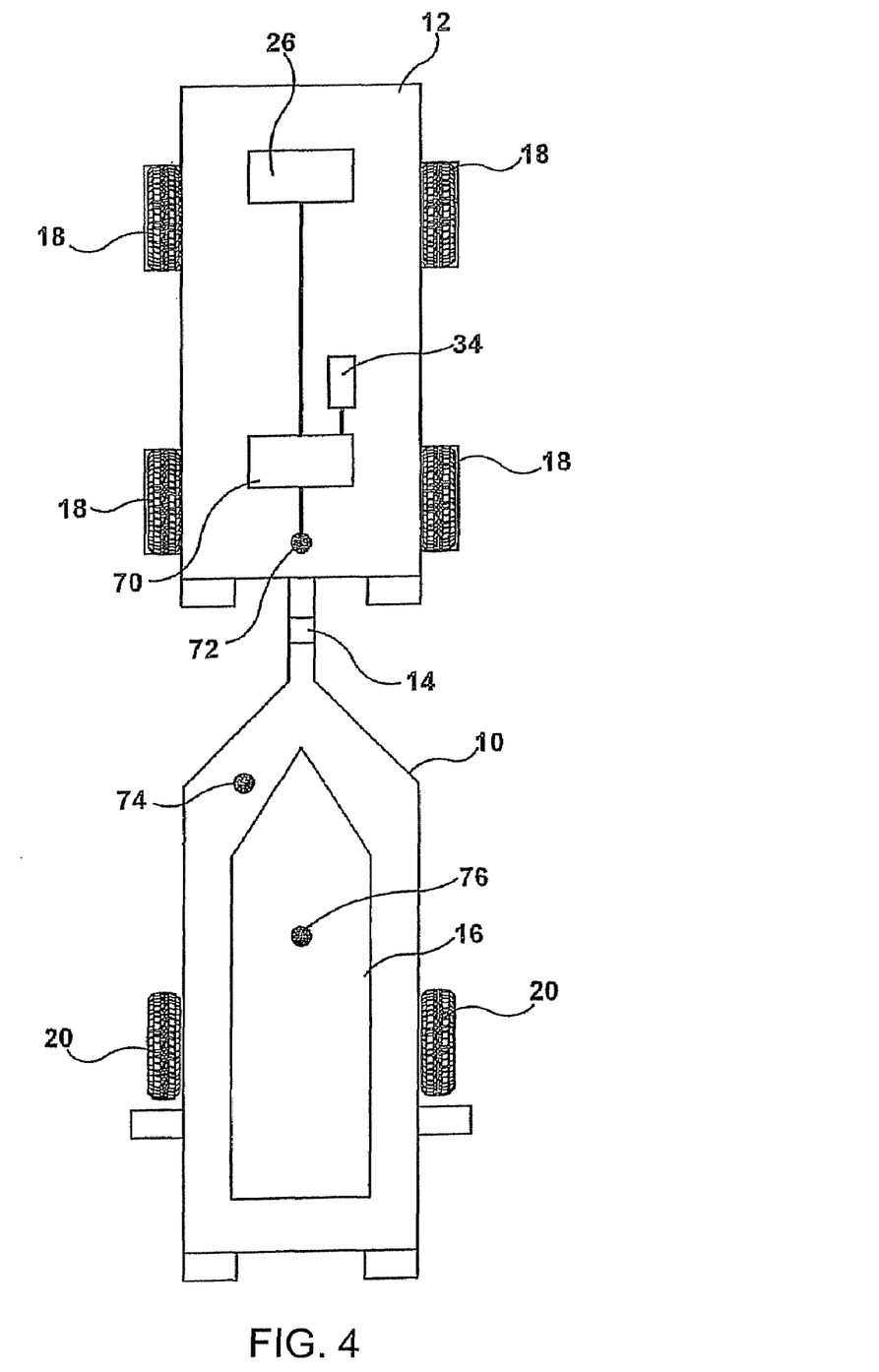
FIG. 4 is a schematic view of yet another embodiment of an alarm arranged in accordance with the present invention.

FIG. 4 schematically represents another embodiment of the present invention. The embodiment shown in FIG. 4 illustrates a wireless system for detecting if a towed item (i.e., a trailer 10 or cargo carried on the trailer 10) is moved a defined distance away from a towing vehicle 12. Similar to the description above, the alarm 70 is directly attached to the vehicle battery 26 to power the alarm. An alarm battery 34 is included to provide backup power to the alarm 70 in the event connection to the vehicle battery 26 is lost. Instead of being connected to the vehicle 12 and trailer 10 lighting systems, the alarm 70 is connected to a wireless transmitter 72 (e.g., a radio frequency (RF) transmitter) also attached to the towing vehicle 12. A wireless transceiver 74, 76 (e.g., an RF receiver) may be secured to one or both of the trailer 10 and the cargo 16. The transmitter 72 transmits a signal intended to be received by one or both of the transceivers 74 and 76. The transceivers 74 and 76 are arranged such that when receiving such a signal, the receivers 74 and 76 reflect a portion of the signal back to be detected by the transmitter 72.

Whether or not a receiver receives a signal from a transmitter and reflects a portion of the signal back to the transmitter is determined by the strength of the signal and the distance between the receiver and transmitter. The strength of a transmitted signal can be adjusted to set a maximum distance a transmitter and receiver can be separated with the transmitter still receiving the reflected signal from the receiver.

In the exemplary embodiment, the signal sent by the transmitter 72 can be adjusted to set a maximum distance the trailer 10 or cargo can move away from the towing vehicle 12 with the transmitter 72 still receiving the reflected signal from the transceivers 74 and 76. For example, the signal generated by the transmitter 72 can be set such that the transceivers 74 and 76 on the trailer 10 and the cargo can only receive and reflect the signal to the transmitter 72 if the trailer 10 or cargo is within twenty feet of the towing vehicle 12. If the transmitter 72 does not detect a reflected signal from either the trailer transceiver 74 or the cargo transceiver 76, the alarm 70 will issue an audible alert to warn that the trailer 10 or cargo is being moved away from the towing vehicle 12.

The alarm 70 can be arranged to command the transmitter 72 to periodically transmit a signal to the transceivers 74 and 76. For example, the transmitter can send a signal every ten milliseconds and issue an alert if the transmitter 72 does not receive a reflected signal for two consecutive transmissions.

Although this embodiment is shown and described with one transceiver attached to one cargo item, it is to be understood that any number of transceivers can be placed on any number of cargo items. The transmitter and alarm can be arranged to detect any cargo item being moved away from the towing vehicle. In addition, the transmitter, transceivers, and alarm can be arranged to identify which specific cargo item has moved away from the towing vehicle. In addition, a transmitter can be placed on the trailer or cargo and a transceiver placed on the towing vehicle. In this arrangement, if the transceiver did not receive a scheduled transmitted signal, the alarm would issue an audible alert.

Each embodiment of this invention can optionally include features to prevent unauthorized persons from disabling the alarm system. One such feature is arranging the alarm to detect when electrical power being delivered from the vehicle battery 26 to the alarm 22 and 70 ceases. An unauthorized person may sever the connection from the vehicle battery 26 to the alarm 22 and 70 in an effort to disable the alarm 22 and 70. The alarm 22 and 70, which can optionally be equipped with a backup battery 34 or rechargeable source of power, can issue an audible alert to warn that the alarm 22 and 70 is being tampered with when the alarm 22 and 70 detects that power from the battery 26 has ceased.

Figure 5:
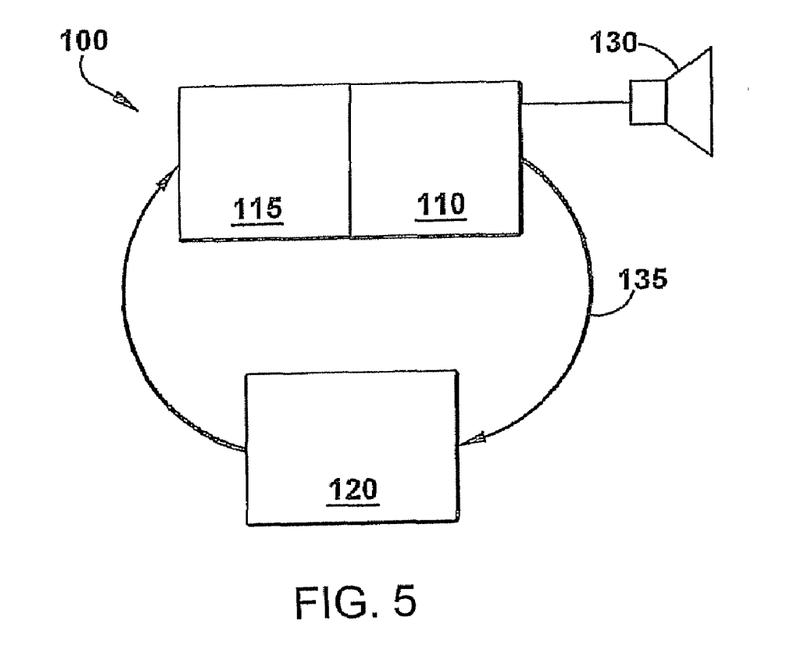
FIG. 5 is a functional block diagram of an alarm arranged in accordance with an embodiment of the present invention.

FIG. 5 is a block diagram that schematically depicts alarm components that can be used to form an alarm system 100. First and second alarm components 110 and 120 are placed within a communication circuit 135 that covers a predetermined area defining a relatively close proximate location between the towing vehicle (not shown) and the trailer or cargo (not shown). One of the first and second alarm components is coupled to the towing vehicle and the other of the components is coupled to the trailer or cargo. One of the components (110 in FIG. 5) includes detection circuitry 115 that is configured to detect the presence of the other alarm component within the communication circuit. Of course, multiple alarm components can be used on a number of trailers or cargo that are to be protected by the alarm system. An alert mechanism, shown symbolically in FIG. 5 as a siren 130 is connected to one of the alarm components and activates a perceptible alert in response to an alert signal from the alarm component.

As outlined above, the alarm components may be connected by a wiring harness to form the communication circuit 135, which may be a dedicated wiring harness between an alarm unit and a sensor or may also serve as the connection for indicator lights on a trailer. In this case, the detection signals that pass between the components may be a test current or voltage sent between an alarm unit on the towing vehicle and the indicator lights on the trailer. The alarm components may be placed within a wireless communication circuit that is tuned to cover a predetermined area to form the communication circuit 135. In this case, the alarm components may be radio frequency transmitters and/or receivers and the signals may be radio frequency transmissions.

Figure 6:
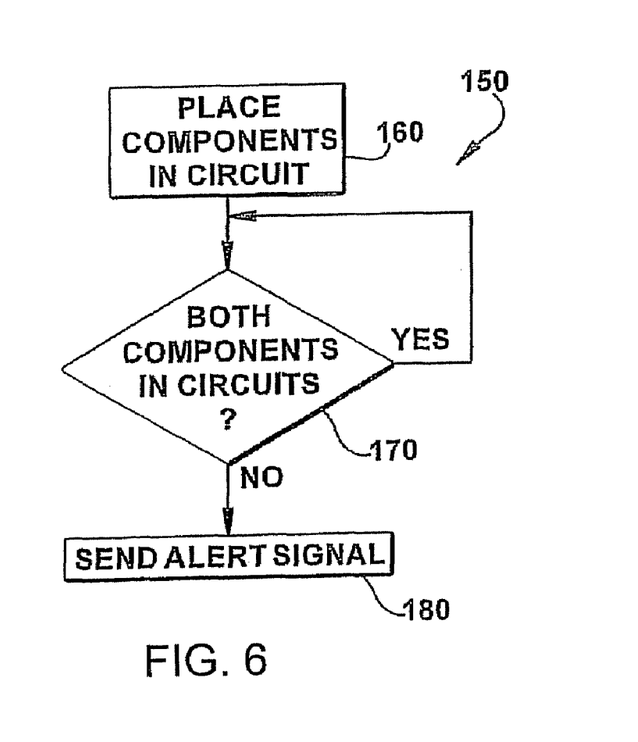
FIG. 6 is a flowchart outlining a method for detecting the proximity of cargo to a towing vehicle according to an embodiment of the present invention.

Referring to FIG. 6, a method 150 for operating the alarm system of FIG. 5 is outlined. At 160, the alarm components are placed in the communication circuit. At 170, the detection signal is used to determine if all alarm components are within the circuit. If all alarm components are not in the circuit, at 180 an alert signal is sent to an alert mechanism such as the siren in FIG. 5.

Although only one sensor is shown and described, it will be understood that any number of sensors can be used in the present invention and attached to any number of towed items. The sensor head can be arranged to include any number of connection points to communicate with any number of sensors and allow the alarm to detect the removal of a single cargo item or all cargo items carried on a trailer.

Figure 7:
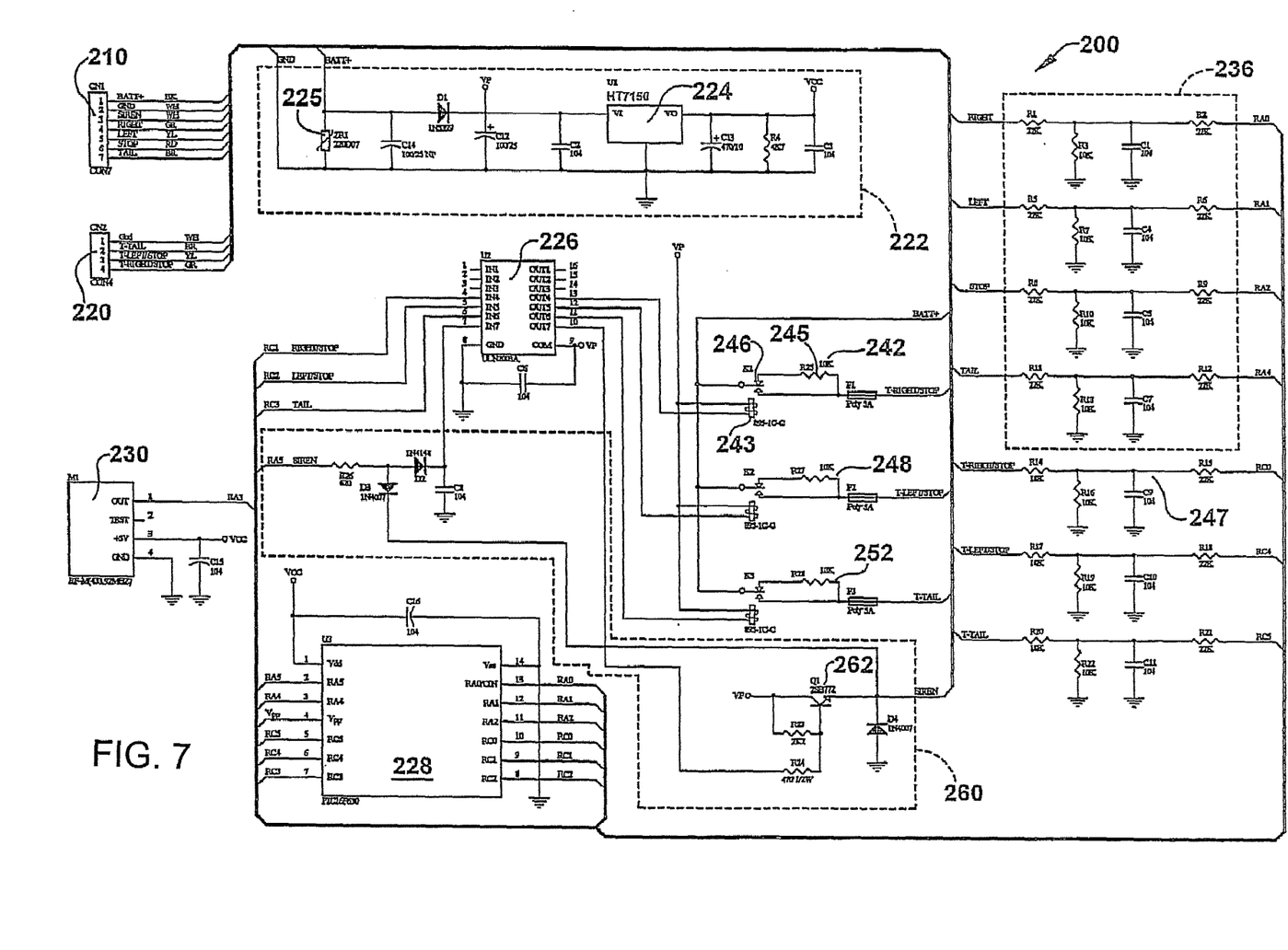
FIG. 7 is an electrical schematic of an alarm constructed in accordance with an embodiment of the present invention.

FIG. 7 is a schematic circuit diagram of an alarm circuit 200 that is placed between a vehicle wiring harness and a trailer lighting receptacle. A six pin input connector 210 is configured to connect with a standard vehicle wiring harness and an additional siren signal line. The input connector 210 provides circuit paths for battery voltage and ground, a siren connection, and right, left, stop, and tail light signals. A four pin output connector 220 is configured to accept a standard four pin trailer light harness and provides circuit paths for a ground connection, tail light signals, and right/stop and left/stop light signals. The alarm 200 accepts the five input signals on the six pins in the input connector 210 and translates them into the four output signals passed by the output connector 220 and a siren actuation signal that is passed to the vehicle via the siren signal connection in the input connector 210.

The alarm 200 includes a voltage regulation circuit, indicated generally by the reference numeral 222. The voltage regulation circuit inputs battery voltage and a reference ground from the vehicle harness and conditions the battery voltage with a surge protector 225 to produce $V_p$, which is used as a high voltage input throughout the alarm 200. A voltage regulator 224 inputs $V_p$ and produces $V_{cc}$, which is used as a 5 volt supply voltage to integrated circuits in the alarm 200. Another voltage related component in the alarm is the voltage PWM controller 230 that produces Vpp, which is used an input to an alarm controller microprocessor 228.

The alarm controller microprocessor 228 inputs the right, left, stop, and tail light signals RA0, RA1, RA2, RA4 from the input connector 210. Based on these inputs, the alarm controller microprocessor produces the tail light and right/stop and left/stop light signals RC1, RC2, RC3 that are output through the output connector 220 to the trailer wiring harness and a siren actuation signal RA5 that is routed to the input connector 210 and to an in-vehicle siren (not shown). These control signals are input to a driver IC 226 that is able to handle the power levels necessary to drive the trailer lights.

The alarm controller microprocessor senses whether a trailer wiring harness is properly installed in the output connector 220 using sensing circuits indicated generally as 242, 248, 252. These three sensing circuits operate similarly and only sensing circuit 242, that is associated with the right/stop trailer light will be described in detail. When the trailer wiring harness is properly installed in the output connector 220 and no right/stop trailer lamp lighting is called for, the sensing circuit 242 is in the condition shown in FIG. 7. A contact 246 connects battery voltage through a resistor 245 to ground through the output connector/trailer wiring harness. Due to the presence of the resistor in the circuit path, in this condition, the generated current is insufficient to light the trailer right/stop. If the harness is not present, there is no path to ground, so that current will not flow. A small portion of the current generated by the battery voltage when the trailer wiring harness is installed flows through a current dividing and conditioning circuit 247 that generates a signal voltage for the microprocessor input marked RC0 that indicates proper installation of the trailer wiring harness when no right/stop trailer lamp lighting is required.

When the microprocessor 228 outputs a signal calling for actuation of the right/stop trailer lamp on RC1, the driver IC 226 connects a path to ground for $V_p$ to cause current to flow through the control coil 243. This presence of current in the control coil 243 urges a contact 246 to move down to connect a direct current path without the resistor 245. This will cause a higher level of current to flow through the output connector 220 and trailer wiring harness to light the right/stop trailer lamp. A small portion of the current will flow through the conditioning circuit 247 to generate the input voltage for the microprocessor input RC0. This signal RC0 will verify that the trailer wiring harness is properly installed when the right/stop trailer lamp is to be lit. It will be apparent to one of skill in the art that the other sensing circuits 248 for the left/stop lamp and 252 for the tail lamps operate in a manner analogous to that described for 242.

If at any time when the microprocessor is in an armed condition, any of the input voltages from the sensing circuits RC0, RC4, or RC5 shows an open circuit condition, the siren actuation signal is provided on line RA5. The siren actuation signal flows through a siren driver circuit 260 that includes a siren control transistor 262. The siren actuation signal flows to the base of the transistor 262 to switch the transistor on and cause $V_p$ to be output on the siren signal line through the input connector to activate the siren in the vehicle. In this manner, in addition to providing appropriate signals to the trailer lamps, the microprocessor senses for proper condition and installation of the trailer harness and provides a siren activation output when the harness is not properly installed.

In another embodiment, a self-contained alarm "box" may be connected to one or both of a towing vehicle and a towed item (e.g., cargo, such as a trailer or item(s) carried by the trailer) mounted to or carried by the vehicle. In one such embodiment, an alarm device may be connected by way of a standard trailer wiring harness receptacle, thereby simplifying installation of the alarm system by allowing for installation without separately wiring the alarm device to the vehicle's wiring system for power and sensing purposes. The alarm device may contain one or more of many suitable alarm components or sensors for detecting separation of the cargo from the vehicle, including, for example, sensing circuitry, proximity sensors, vibration sensors, wireless transponders, mechanical switches, accelerometers, or other such equipment or devices, to detect changes in movement, position, proximity, electrical continuity, or other such conditions.

Figure 8:
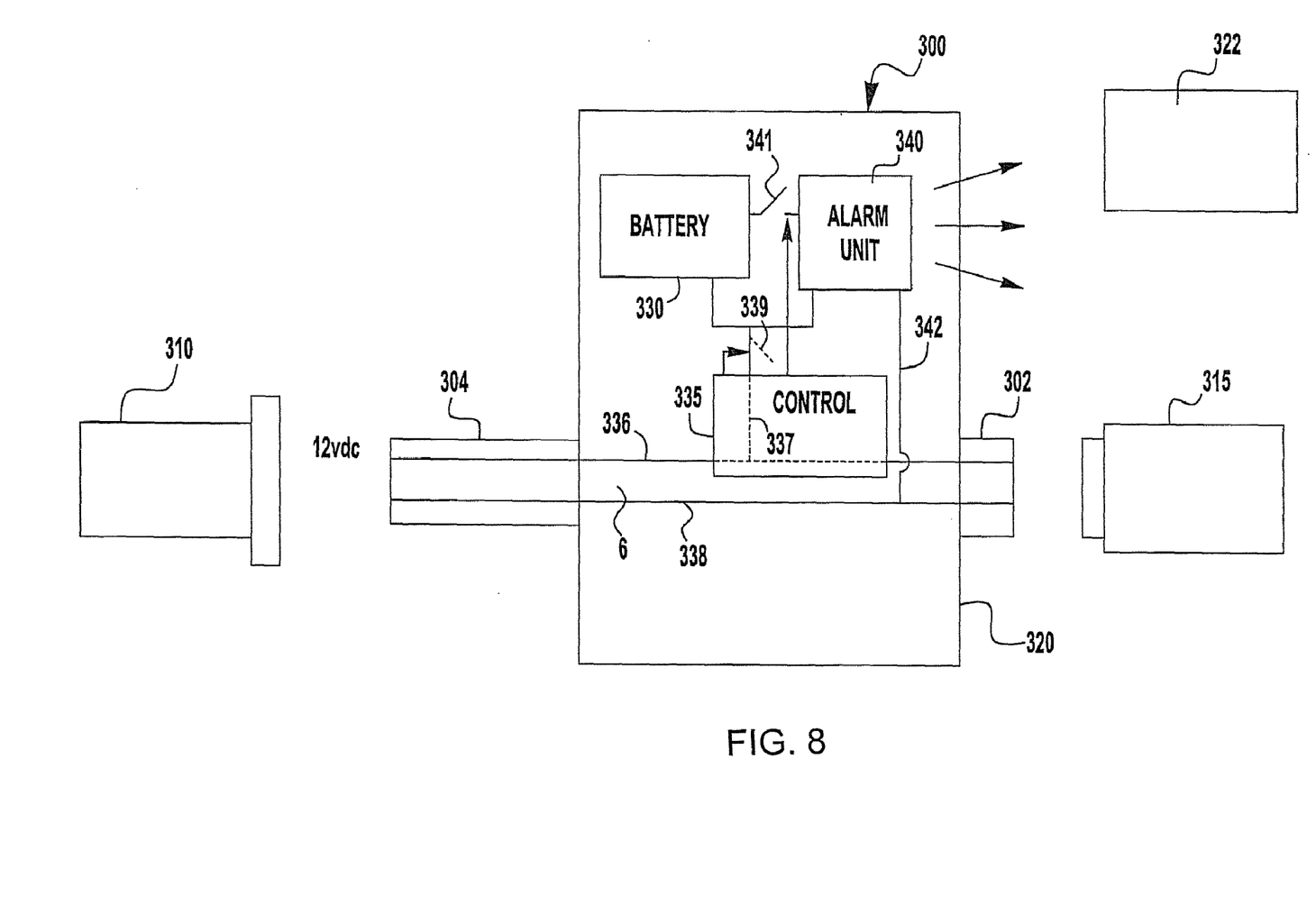
FIG. 8 is a schematic diagram of an alarm system for assembly with a vehicle and trailer.

FIG. 8 schematically illustrates an exemplary self contained alarm device or "box" 300 for assembly with a vehicle trailer wiring receptacle 310 (on a towing vehicle, not shown) and a corresponding trailer wiring connector 315 (on a trailer, not shown). The embodiment shown in FIG. 8 is adapted for use with a seven pin trailer connection, however, any type of connection configuration could be used in practice of the invention. The alarm device 300 includes a connector 304 that is adapted to mate with the receptacle 310. As discussed in more detail below, the alarm device 300 passes all of the signals from the receptacle 310 through to an alarm receptacle 302 that receives the trailer wiring connector 315. Alternatively, the alarm device could be adapted to be used with a four pin connector, or any other suitable wiring harness connector. In the case of a four pin connector, it may be advantageous to provide a separate power lead from the vehicle's battery to the alarm device, because in a four pin system, power is only present on the power lead when the vehicle lights are on.

Electrically, the alarm device 300 is placed in series between the vehicle's electrical system and the trailer's electrical system. The mechanical aspects of the alarm device may vary to accommodate various mounting schemes. For example, the alarm device 300 may be wholly supported by the connector 304 and thus be mounted in the vehicle's receptacle 310. Additionally or alternatively, the alarm device 300 could be mounted by separate means to the vehicle or trailer, with wiring provided that routes signals from the receptacle 310 through the alarm device 300 and to a trailer connector 315.

As described in various exemplary embodiments above, the alarm device 300 senses the condition of a circuit made by one or more components of the trailer and/or the vehicle (e.g., the trailer lights or a wireless circuit between the trailer and the vehicle). The alarm device sends an alert signal when the circuit is open, indicating that the trailer has been removed or that the alarm's wires have been cut. In the embodiment shown in FIG. 8, the alarm device 300 sends the alert signal wirelessly to a wireless siren 322 mounted elsewhere on the vehicle or on the trailer, such as, for example, under the vehicle's hood near the battery. Additionally or alternatively, a siren or other alerting mechanism may be directly connected, wired to, or contained within the alarm device 300.

The connector 304 includes a power line 336 that picks up vehicle battery voltage, typically 12V DC, from the receptacle 310 (FIG. 8). The connector also includes a signal path 338 that picks up the other signals supplied to the seven pin connector, corresponding to various trailer lights, electric brakes, or other power consuming equipment or controls. All of the signals are routed to the receptacle 302 as well as being connected to other alarm device components disposed within a housing or enclosure 320 of the device. The alarm device 300 includes, functionally, an on-board power source such as, for example, a battery component 330, an alarm unit 340, and a battery control unit 335. In some embodiments, the alarm unit 340 functions as described above in connection with FIGS. 1-3, and senses the condition of the trailer wiring circuits. The alarm unit 340 receives these signals for monitoring on a sensing path 342 that branches from the signal path 338. The alarm unit 340 provides a wireless alert signal to the siren based on the condition of these signals.

In other embodiments, an alarm device connected to at least one of a towed item (e.g., a trailer or other cargo) and a towing vehicle may be configured to utilize different sensing mechanisms to identify electrical and/or physical separation of the trailer from the towing vehicle. For example, the alarm unit may include one or more proximity sensors, vibration sensors, sensing circuitry, wireless transponders, mechanical switches, accelerometers, or other such equipment or devices. The alarm device may be locked or otherwise secured to one or both of the trailer and the towing vehicle, to inhibit removal, disabling, or disassembly of the alarm device. Additionally or alternatively, the alarm unit in the alarm device may be configured to produce an alert signal in response to efforts to remove, disable, or disassemble the alarm device.

In the embodiment of FIG. 8, the alarm unit receives power either directly from the vehicle or from the battery component 330. The control unit 335 controls circuit components, such as, for example, switches 339, 341 to provide power to the alarm unit from one of these sources. When the vehicle's ignition is on, power is present on power line 336. When power is present, the control unit 335 closes switch 339 and opens switch 341 so that the power from the vehicle is routed along a power path 337 to the alarm unit 340 to power it and to the battery component 330 to recharge it. In an exemplary embodiment, the battery component 330 includes one or more rechargeable Nickel Cadmium batteries, such as for example, rechargeable AA size batteries. In other embodiments, the battery component may be any type of rechargeable battery, such as, for example, lithium batteries typically used for cellular phones. When the alarm device 300 is operating in this "vehicle on" mode, it will provide an alert signal if the power is removed, which would indicate that the alarm device has been electrically disconnected from the vehicle.

When the vehicle ignition is not on, no power is available on the power line 336. In this case, the control unit closes the switch 341 and opens the switch 339 to cause the alarm unit to draw power from the battery component 330. In this mode, the battery component is disconnected from the vehicle's power source. When rechargeable NiCad batteries are used, it is believed that the battery will be able to provide power to the alarm unit for a relatively extended period of time, such as for example, 48 hours. It should be understood by others with ordinary skill in the art that various battery arrangements that power alarm systems for a wide variety of time intervals are useable in the practice of this invention. In the "vehicle off" condition, the battery component 330 powers the alarm unit to function as described above. In another embodiment, power may be supplied to the alarm unit via the auxiliary line of the seven pin wiring harness.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

I claim:

1. An alarm device for use with a vehicle, the device comprising:
   a first connector for electrical connection with a vehicle trailer wiring receptacle of a vehicle;
   a second connector for electrical connection with a trailer wiring connector of a trailer;
   a power line electrically connecting the first connector to the second connector to deliver vehicle power from the first connector to the second connector;
   a signal path electrically connecting the first connector to the second connector to deliver electrical signals from the vehicle to the electrically operable components on the trailer when the vehicle trailer wiring receptacle is connected with the first connector and the trailer wiring receptacle is connected with the second connector;
   an alarm component electrically connected in series between the first and second connectors, the alarm component being configured to detect an electrical condition indicating an unauthorized attempt to separate the trailer from the vehicle and produce a corresponding alert signal; and
   a sensor mountable to one of the trailer and an item carried by the trailer, wherein the alarm component and the sensor are disposed within a communication circuit covering a predetermined area, wherein the sensor is configured to provide an alert signal when the communication circuit is broken by removal of the sensor from the communication circuit.

2. The alarm device of claim 1, further comprising a housing enclosing the alarm component and a battery disposed within the housing and in electrical communication with the alarm component for powering the alarm component when vehicle power is not being delivered from the first connector to the second connector.

3. The alarm device of claim 1, further comprising an alert mechanism in communication with the alarm component and configured to receive the alert signal and provide a perceptible alert in response to the alert signal.

4. The alarm device of claim 3, wherein the alert mechanism is in wireless communication with the alarm component.

5. The alarm device of claim 1, wherein the alarm component includes detection circuitry configured to detect one or more electrical signals on the signal path, the alarm component being configured to provide an alert signal when the one or more electrical signals are not detected.

6. The alarm device of claim 1, wherein the alarm component includes detection circuitry configured to detect one or more trailer lighting signals on the signal path, the alarm component being configured to provide an alert signal when the one or more trailer lighting signals are not detected.

7. The alarm device of claim 1, wherein the sensor includes a circuit completion mechanism that is activated to complete the communication circuit when the sensor is connected with at least one of the vehicle and the trailer, the communication circuit being broken when the sensor is disconnected from the at least one of the vehicle and the trailer.

8. The alarm device of claim 7, wherein the circuit completion mechanism comprises a switch that is urged into a closed position when the sensor is connected with the at least one of the vehicle and the trailer.

9. Then alarm device of claim 1, wherein the communication circuit comprises a wireless communication circuit and wherein the sensor comprises a radio frequency receiver configured to reflect a portion of a received transmission back through the communication circuit and wherein the alarm component comprises a radio frequency transmitter that periodically transmits a radio detection transmission and receives the reflected portion of the detection transmission when the first alarm component is present in the communication circuit.

10. The alarm device of claim 1, wherein the sensor includes a vibration sensor that is activated to complete the communication circuit when the vibration sensor is installed on the one of the trailer and the item carried by the trailer, and wherein when the vibration sensor detects a predetermined level of vibration, the vibration sensor breaks the communication circuit.

11. The alarm device of claim 1, wherein the sensor includes a proximity sensor that is activated to sense a predetermined proximity of the alarm component to complete the communication circuit and wherein when the sensor no longer detects the predetermined proximity of the alarm component, the proximity sensor breaks the communication circuit.

12. A method of detecting separation of a towed item from a towing vehicle, the method comprising:
connecting a sensor to one of the item and the vehicle;
connecting an alarm component to the other of the item and the vehicle;
placing the alarm component and the sensor within a communication circuit covering a predetermined area;
determining the presence of the sensor and the alarm component within the communication circuit;
providing an alert signal when one of the sensor and the alarm component is not detected within the communication circuit; and
providing a perceptible alert in response to the alert signal,
wherein disconnecting the sensor from the one of the item and the vehicle deactivates a circuit completion mechanism to remove the sensor from the communication circuit; and
further wherein determining the presence of the sensor and the alarm component within the communication circuit comprises sensing a voltage that is generated when current flows through the sensor.

13. A method of detecting separation of a towed item from a towing vehicle, the method comprising:
connecting a sensor to one of the item and the vehicle;
connecting an alarm component to the other of the item and the vehicle;
placing the alarm component and the sensor within a communication circuit covering a predetermined area;
determining the presence of the sensor and the alarm component within the communication circuit;
providing an alert signal when one of the sensor and the alarm component is not detected within the communication circuit; and
providing a perceptible alert in response to the alert signal,
wherein disconnecting the sensor from the one of the item and the vehicle deactivates a circuit completion mechanism to remove the sensor from the communication circuit; and
further wherein the circuit completion mechanism comprises a switch that is urged into a closed position when the sensor is installed on the one of the item and the vehicle and that returns to an open position when the sensor is disconnected from the one of the item and the vehicle.

14. A method of detecting separation of a towed item from a towing vehicle, the method comprising:
connecting a sensor to one of the item and the vehicle;
connecting an alarm component to the other of the item and the vehicle;
placing the alarm component and the sensor within a communication circuit covering a predetermined area;
determining the presence of the sensor and the alarm component within the communication circuit;
providing an alert signal when one of the sensor and the alarm component is not detected within the communication circuit; and
providing a perceptible alert in response to the alert signal,
wherein disconnecting the sensor from the one of the item and the vehicle deactivates a circuit completion mechanism to remove the sensor from the communication circuit; and
further wherein the communication circuit comprises a wiring harness between the sensor and the alarm component, and wherein determining the presence of the sensor and the alarm component within the communication circuit comprises generating a sensor detection signal in the alarm component that passes through the communication circuit and monitoring a response of one or more circuit parameters of the detection signal at the sensor.

15. The method of claim 12 wherein the communication circuit comprises a wireless communication circuit and wherein the sensor comprises a radio frequency receiver configured to reflect a portion of a received transmission back through the communication circuit and wherein the alarm component comprises a radio frequency transmitter that periodically transmits a radio detection transmission and receives the reflected portion of the detection transmission when the first alarm component is present in the communication circuit.

16. The method of claim 14 wherein determining the presence of the sensor and the alarm component within the communication circuit comprises sensing a voltage that is generated when current flows through the sensor.

17. A method of detecting separation of a towed item from a towing vehicle, the method comprising:
connecting a sensor to one of the item and the vehicle;
connecting an alarm component to the other of the item and the vehicle;
placing the alarm component and the sensor within a communication circuit covering a predetermined area;
determining the presence of the sensor and the alarm component within the communication circuit;
providing an alert signal when one of the sensor and the alarm component is not detected within the communication circuit; and
providing a perceptible alert in response to the alert signal,
wherein disconnecting the sensor from the one of the item and the vehicle deactivates a circuit completion mechanism to remove the sensor from the communication circuit; and further wherein connecting the sensor to one of the item and the vehicle comprises providing the sensor in a housing of an alarm device having a first connector extending from the housing for electrical connection with a vehicle trailer wiring receptacle of a vehicle, and a second connector extending from the housing for electrical connection with a trailer wiring connector of a trailer, the sensor being in electrical communication with the first and second connectors.

18. A method of detecting separation of a towed item from a towing vehicle, the method comprising:
    connecting a sensor to one of the item and the vehicle;
    connecting an alarm component to the other of the item and the vehicle;
    placing the alarm component and the sensor within a communication circuit covering a predetermined area;
    determining the presence of the sensor and the alarm component within the communication circuit;
    providing an alert signal when one of the sensor and the alarm component is not detected within the communication circuit; and
    providing a perceptible alert in response to the alert signal,
    wherein disconnecting the sensor from the one of the item and the vehicle deactivates a circuit completion mechanism to remove the sensor from the communication circuit; and
    further wherein connecting the alarm component to the other of the item and the vehicle comprises providing the alarm component in a housing of an alarm device having a first connector extending from the housing for electrical connection with a vehicle trailer wiring receptacle of a vehicle, and a second connector extending from the housing for electrical connection with a trailer wiring connector of a trailer, the alarm being in electrical communication with the first and second connectors.

* * * * *